Patented Aug. 16, 1938

2,126,798

UNITED STATES PATENT OFFICE 2,126,798

RECOVERY PROCESS FOR GOLD AND OTHER METALS

John A. Miner, St. Louis, Mo., assignor to Carl A. Hahn, Kirkwood, Mo., as trustee No Drawing. Application March 16, 1936, Serial No. 69,136

2 Claims. (Cl. 209—176)

This invention relates to a recovery process for gold and other metals.

The method of recovering gold and other metals from the metal bearing sand, concentrate, crushed ore or the like by the amalgamating process has been known and in common use.

This method consists generally in feeding the metal bearing material from a hopper through a mill and delivering it into the amalgamator, which comprises generally a series of plates coated with mercury with which the metal to be recovered contacts and with which it amalgamates. Since this process is so well known in the art, it is not necessary to describe it in further detail, but it is mentioned simply to identify the general process in connection with which the treatment of the present invention is used.

Recovery by the amalgamating process is adapted to recover the metals in the so-called free state.

Many of the metal bearing conglomerates are so lean in the metal to be recovered that it is entirely uneconomical and uncommercial to process them for metal recovery by the amalgamating process.

It has been discovered that where the conglomerate contains even very small quantities of the fine or flour metal in the free state that by giving them a pretreatment, in accordance with the invention herein disclosed, the recovery is greatly increased, making it possible to commercially treat the conglomerates by the amalgamating process that heretofore resulted in no commercial recovery.

The invention therefore consists in the following procedure. To the material to be fed to the apparatus in which the amalgamating process is practiced is added a solution of cupric sulfate and sodium hydroxide. The conglomerate is then sufficiently saturated with water so that it will be of a consistency normally employed in connection with the amalgamating process.

A representative quantitative formula for the treating solution, which is given by way of example and not as a limitation, consists of approximately 1 pound of cupric sulfate and 1 pound of sodium hydroxide to 40 gallons of water.

The amount of this solution to be added to the metal bearing material is, for example, 1 gallon of the solution to one ton of the material containing one-third of an ounce of gold to the ton. It will be understood that the concentration of the cupric sulfate and sodium hydroxide solution may be varied in respect of the richness or leanness of the metal bearing material.

It has also been discovered that it is highly advantageous to add the solution as well as the super-added water to bring the material to a sufficiently saturated state for processing, at a temperature of approximately 100° F., or higher.

The pretreatment of the metal bearing conglomerate is applicable to conglomerates containing platinum, gold, silver, tin and other metals that will amalgamate and be recoverable by the amalgamating process, in all of which instances the per cent. of recovery is greatly increased by the method herein disclosed.

The action of the sodium hydroxide on the gold or other amalgamable metal is mechanical, for the sodium hydroxide cleans the gold of contaminating vegetable matter and other coating substances. The nature of the action of the sodium hydroxide upon the coating substances is, of course, unimportant. The cupric sulfate supplies copper which establishes an adhesive affinity with the gold particles after they have been cleansed by the sodium hydroxide. The weight of the recovered particles is thereby sufficiently increased to permit of separation of the particles from the conglomerate and the subsequent successful commercial amalgamation thereof with mercury. The copper is subsequently separated from the gold, or other recovered metal, by well known processes. It is known that with the present pretreatment the metal builds up on the plates of the amalgamator in a new and different way from the usual manner in which untreated material amalgamates. It also produces a much dryer amalgam on the accumulating plates of the amalgamator.

It has been found also that the quantities of mercury employed under the known amalgamating method may be greatly reduced by pretreating the material as herein disclosed. The reduction in the amount required in many instances exceeds fifty per cent. The particles of the metal adhere closely and build up more rapidly than in the usual process.

It will be understood that the invention is not to be limited to any specific proportions, except as stated in the appended claims.

I claim:

1. The process of pretreating a conglomerate containing metals adapted to be recovered by amalgamation consisting of adding sodium hydroxide and cupric sulfate to water in predetermined quantities, and adding the solution thus obtained to the metal bearing conglomerate in quantity determined by the metal richness of the conglomerate.

2. The process of pretreating a conglomerate containing metals adapted to be recovered by amalgamation consisting of forming a solution by adding one pound of cupric sulfate and one pound of sodium hydroxide to forty gallons of water, and adding one gallon of the solution thus formed to one ton of gold bearing conglomerate having one-third of an ounce of gold therein.

JOHN A. MINER.